US008365086B2

(12) United States Patent
Grace et al.

(10) Patent No.: US 8,365,086 B2
(45) Date of Patent: Jan. 29, 2013

(54) SYSTEM AND METHOD FOR BUILDING GRAPHICAL INSTRUMENT PANELS

(75) Inventors: Andrew Grace, Sherborn, MA (US); Pieter J. Mosterman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 734 days.

(21) Appl. No.: 11/121,794

(22) Filed: May 3, 2005

(65) Prior Publication Data

US 2006/0253792 A1     Nov. 9, 2006

(51) Int. Cl.
*G06F 3/048*     (2006.01)

(52) U.S. Cl. ........ 715/771; 715/964; 715/970; 717/104; 717/105; 717/124; 717/125; 717/126; 717/127

(58) Field of Classification Search .......... 715/762–763, 715/771, 744, 769, 773, 964, 967, 970; 717/104–138; 719/329; 700/86, 87; 703/1–28; 716/11

See application file for complete search history.

(56) References Cited

U.S. PATENT DOCUMENTS

| | | | | |
|---|---|---|---|---|
| 5,291,587 A | * | 3/1994 | Kodosky et al. | ................... 703/2 |
| 5,301,336 A | * | 4/1994 | Kodosky et al. | .............. 715/846 |
| 5,325,481 A | * | 6/1994 | Hunt | ............................. 715/809 |
| 5,553,227 A | * | 9/1996 | Berry | ............................ 715/839 |
| 5,576,946 A | * | 11/1996 | Bender et al. | ................... 700/17 |
| 5,664,129 A | * | 9/1997 | Futatsugi et al. | ............. 715/763 |
| 5,734,863 A | * | 3/1998 | Kodosky et al. | ................. 703/27 |
| 5,760,788 A | * | 6/1998 | Chainini et al. | ............. 345/474 |
| 5,911,070 A | | 6/1999 | Solton et al. | |
| 5,966,532 A | * | 10/1999 | McDonald et al. | ........... 717/105 |
| 6,053,951 A | * | 4/2000 | McDonald et al. | ........... 717/109 |
| 6,113,649 A | | 9/2000 | Govindaraj et al. | |
| 6,131,184 A | * | 10/2000 | Weeren et al. | ................. 717/109 |
| 6,154,875 A | * | 11/2000 | Tanaka et al. | .................. 717/107 |
| 6,182,278 B1 | * | 1/2001 | Hamada et al. | ............... 717/107 |

(Continued)

OTHER PUBLICATIONS

Kacsuk, Péter et al, "Designing parallel programs by the graphical language GRAPNEL," *Microprocessing and Microprogramming*, vol. 41:625-643 (1996).

(Continued)

*Primary Examiner* — Kyle Stork
*Assistant Examiner* — Eric Wiener
(74) *Attorney, Agent, or Firm* — Nelson Mullins Riley & Scarborough LLP

(57) ABSTRACT

A mechanism for constructing a software-based instrument panel or front panel in which the components correspond directly with sections of code in a textual language program is disclosed. The textual language program relates to how the panel updates and operates in a continuous fashion. Icons representing panel components are selected from a component library window displayed to a user. The act of dragging the icon representing the components into the Graphical Panel Layout Window automatically causes the corresponding code to be added to the textual language program and displayed to the user in a Program Dialog Window. The present invention displays both a Graphical Panel Layout Window showing the components in the instrument panel and a Program Dialog Window showing the lines of code for the textual language program controlling the operation of the components in the instrument panel. A library containing I/O dialog devices is also presented and displayed to a user. The selection by the user of an I/O device icon and the subsequent dragging of the icon into either the Graphical Panel Layout Window or the Program Dialog Window causes the associated lines of code to appear in the Program Dialog Window.

34 Claims, 6 Drawing Sheets

U.S. PATENT DOCUMENTS

| | | | |
|---|---|---|---|
| 6,216,261 B1* | 4/2001 | Mitchell | 717/107 |
| 6,233,726 B1* | 5/2001 | Bowman et al. | 717/107 |
| 6,252,591 B1* | 6/2001 | Dockweiler et al. | 715/744 |
| 6,282,699 B1 | 8/2001 | Zhang et al. | |
| 6,337,696 B1* | 1/2002 | Lindhorst et al. | 715/763 |
| 6,366,300 B1* | 4/2002 | Ohara et al. | 715/771 |
| 6,684,385 B1* | 1/2004 | Bailey et al. | 717/109 |
| 6,701,513 B1* | 3/2004 | Bailey | 717/109 |
| 6,792,595 B1* | 9/2004 | Storistenau et al. | 717/110 |
| 6,851,107 B1* | 2/2005 | Coad et al. | 717/108 |
| 7,000,190 B2* | 2/2006 | Kudukoli et al. | 715/763 |
| 7,062,718 B2* | 6/2006 | Kodosky et al. | 715/771 |
| 7,079,141 B2* | 7/2006 | Vazquez et al. | 345/440 |
| 7,120,876 B2* | 10/2006 | Washington et al. | 715/763 |
| 7,134,086 B2* | 11/2006 | Kodosky | 715/763 |
| 7,159,183 B1* | 1/2007 | Kudukoli et al. | 715/762 |
| 7,200,838 B2* | 4/2007 | Kodosky et al. | 717/116 |
| 7,210,117 B2* | 4/2007 | Kudukoli et al. | 717/100 |
| 7,243,334 B1* | 7/2007 | Berger et al. | 717/109 |
| 7,275,235 B2* | 9/2007 | Molinari et al. | 717/100 |
| 7,322,023 B2* | 1/2008 | Shulman et al. | 717/112 |
| 7,331,019 B2* | 2/2008 | Ananth et al. | 715/771 |
| 7,331,039 B1* | 2/2008 | Yip et al. | 717/125 |
| 7,340,721 B1* | 3/2008 | Bailey | 717/109 |
| 7,370,315 B1* | 5/2008 | Lovell et al. | 717/100 |
| 7,376,904 B2* | 5/2008 | Cifra et al. | 715/763 |
| 7,392,507 B2* | 6/2008 | Kolawa et al. | 717/124 |
| 7,451,403 B1* | 11/2008 | Srinivasan et al. | 715/763 |
| 7,650,576 B2* | 1/2010 | Becerra, Jr. | 715/771 |
| 7,676,790 B1* | 3/2010 | Hsu et al. | 717/106 |
| 2003/0058280 A1* | 3/2003 | Molinari et al. | 345/771 |
| 2003/0071845 A1* | 4/2003 | King et al. | 345/764 |
| 2006/0206827 A1* | 9/2006 | DeWitt | 715/762 |

OTHER PUBLICATIONS

Stovsky, M.P. et al, "STILE: A Graphical Design and Development Environment," *Ruthenium, Handbuch Der Anorganischen Chemie,* vol. 63:247-250 (1986).

International Search Report for Application No. PCT/US2006/016989, dated May 3, 2005.

European Communication for Application No. 06769985.0-1243, dated Apr. 10, 2008.

* cited by examiner

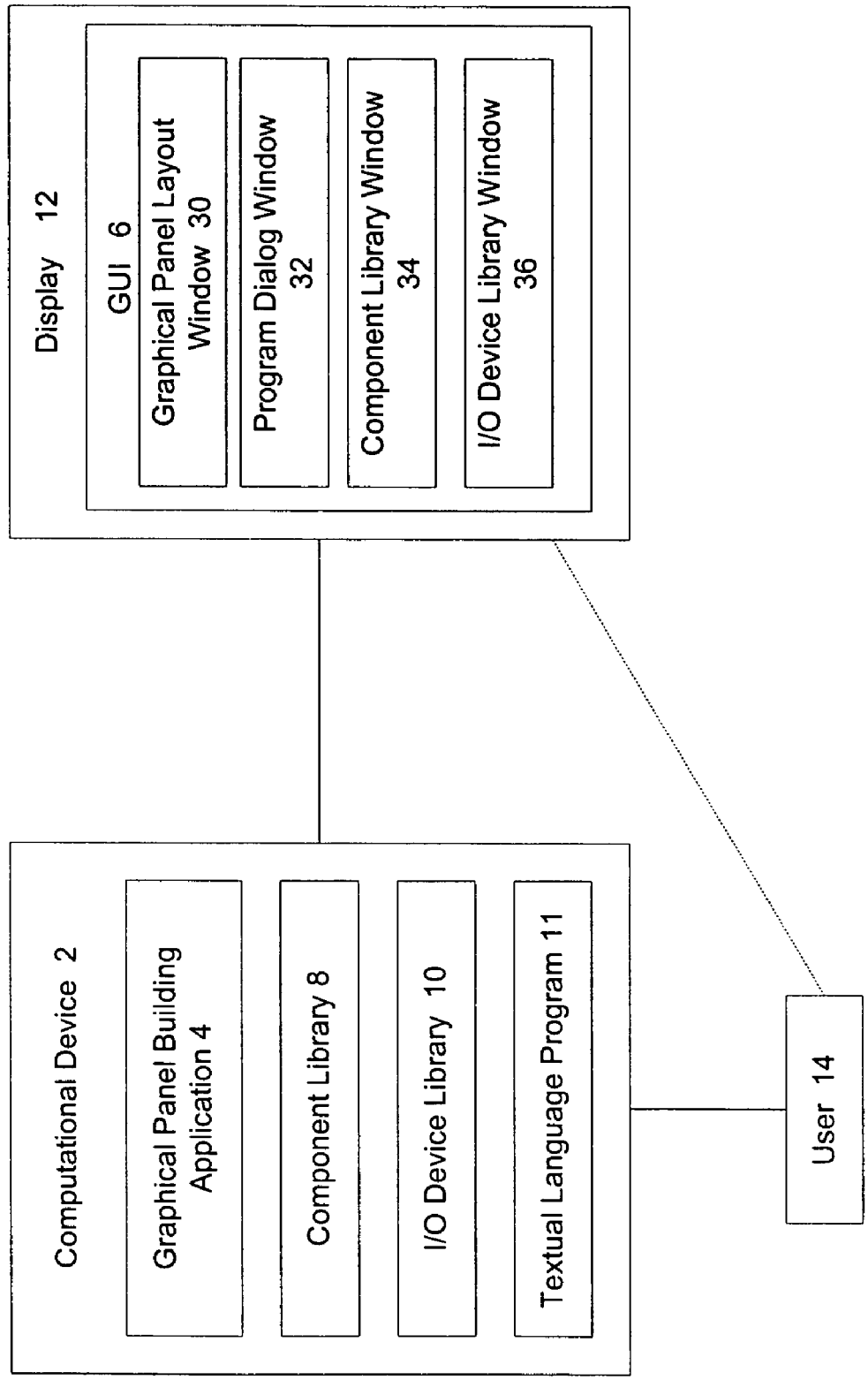

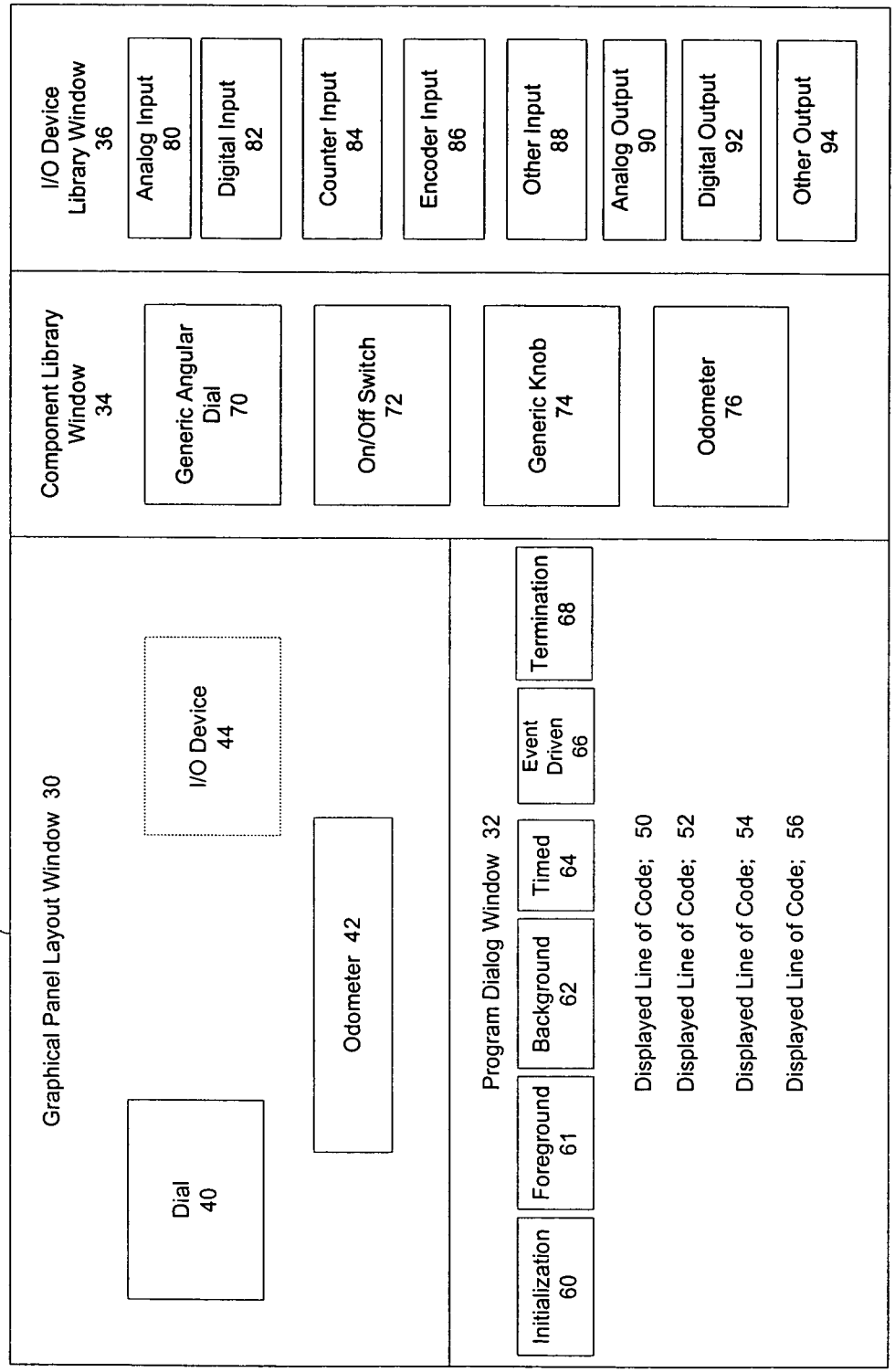

SYSTEM AND METHOD FOR BUILDING GRAPHICAL INSTRUMENT PANELS

FIELD OF THE INVENTION

The illustrative embodiment of the present invention relates generally to the building of graphical instrument panels, and more particularly to the building of a software-based instrument panel controlled by a textual language program in which the panel components correspond directly with sections of code in the program.

BACKGROUND

Software virtual instruments frequently include a front or instrument panel GUI that accepts user input for the virtual instrument. The front panel provides a graphical representation of input and output variables provided to the virtual instrument. The virtual instruments frequently also include a block diagram connected to the front panel which provides visual representations of a procedure in which displayed input values taken from the front panel can produce a corresponding value for an output variable in the front panel. The virtual instrument may have a hierarchical construction which includes additional virtual instruments.

An example of a type of conventional instrument panel is one constructed using LABVIEW from National Instruments of Austin, Texas.

LABVIEW is a graphical development environment for signal acquisition, measurement analysis and data presentation. Users utilizing the application are able to construct virtual instruments with front instrument panels. LABVIEW provides two components for a virtual instrument, a graphical instrument panel and a data flow diagram. Components in the front panel are connected to the input and output of the data flow diagram. The data flow diagram is compiled into executable code. The results from the execution of the code are provided back to the user through the front panel. There is no programming corresponding directly to the component in the front panel without the use of the data flow diagram.

Another example of conventional software-based graphical instrument panels may be found in VISUAL BASIC from Microsoft Corporation of Redmond, Wash. Visual Basic is a visual interface design package to which a programmer attaches snippets of code for callbacks. Callbacks are registrations in which a software entity/process requests notification upon the occurrence of a designated event occurring. Upon detection of the event, and a subsequent notification, a previously specified execution of programming occurs. For example, a function may be executed upon the occurrence of a particular event.

Unfortunately, both of these conventional methods of setting up software-based graphical instrument panels suffer from several drawbacks. The front panels that are connected to data flow diagrams are dependent on the data flow diagram to perform information processing. Since data flow diagrams are difficult to program for complex computational operations, this limits their effectiveness. Similarly, callback programming is particularly difficult to use when setting up continuously running (multi-component) panels that operate and interface in real-time. The difficulty arises from performing the callbacks required by the multiple components in real-time.

BRIEF SUMMARY OF THE INVENTION

The illustrative embodiment of the present invention provides a mechanism for constructing a software-based instrument panel or front panel in which the components correspond directly with sections of code in a textual language program. The textual language program relates to how the panel updates and operates in a continuous fashion. Icons representing panel components are selected from a component library window displayed to a user. The act of dragging the icon representing the components into the Graphical Panel Layout Window automatically causes the corresponding code to be added to the textual language program and displayed to the user in a Program Dialog Window. The present invention displays both a Graphical Panel Layout Window showing the components or a graphical representation of the components in the instrument panel and a Program Dialog Window showing the lines of code for the textual language program controlling the operation of the components in the instrument panel. A library containing I/O dialog devices may also be presented and displayed to a user. The selection by the user of an I/O device icon and the subsequent dragging of the icon into either the Graphical Panel Layout Window or the Program Dialog Window causes the associated lines of code to appear in the Program Dialog Window. Panel properties for the components and I/O devices in the Graphical Panel Layout window may be directly set by the user. Each of the components and I/O devices displayed in the panel layout window correspond directly to the associated section of code in the Program Dialog Window.

In one embodiment, a system for building instrument panels includes a graphical user interface (GUI) for rendering and placing components on the instrument panel. The GUI displays the instrument panel in a layout window to a user. The system also includes a textual language program. The textual language program is associated with the instrument panel and includes code for the execution of the components in the instrument panel with at least one component on the instrument panel directly corresponding with a section of the code in the program. The program runs in a continuous mode during execution.

In another embodiment, in a computational device a method of building instrument panels includes the steps of providing a graphical user interface (GUI) for rendering and placing components on the instrument panel. The GUI displays the instrument panel in a layout window, to the user. The method also includes the step of associating a textual language program with the instrument panel. The textual language program includes code for the execution of the components in the instrument panel with at least one component on the instrument panel directly corresponding with a section of the code in the textual language program. The method further includes the step of displaying multiple icons representing components in a library that may be placed in the instrument panel which runs continuously during execution of the program.

In an embodiment, a system for building instrument panels includes a graphical user interface (GUI) for rendering and placing components on the instrument panel. The GUI displays the instrument panel in a layout window to a user. The system also includes a textual language program. The textual language program is associated with the instrument panel and includes code for the execution of the components in the instrument panel with at least one component on the instrument panel directly corresponding directly with a section of the code in the program which runs in a continuous mode of operation during execution.

In an additional embodiment, a system for building front panels for a virtual instrument includes a graphical panel building application. The graphical panel building application generates a graphical user interface (GUI) for rendering and placing components on a front panel for a virtual instrument. The GUI displays the front panel in a layout window to a user. The system also includes at least one of a collection of data structures holding components that are placed in the front panel and a collection of data structures holding I/O devices that are placed in the front panel. The system additionally includes a textual language program that is associated with the front panel and includes code for the execution of components in the front panel. At least one component on the front panel directly corresponds with a section of the code and the program runs in a continuous mode of operation during execution. The system further includes a distribution server distributing to a client device at least one of the graphical panel building application, the generated GUI, the textual language program, or the collection of data structures. The system also includes a client device in communication with the distribution server.

In one embodiment in a network, a method of building instrument panels for a virtual device includes the step of providing a server executing a graphical panel building application. The graphical panel building application generates a graphical user interface (GUI) for rendering and placing components on an instrument panel. The method also includes the steps of providing a client device in communication with the server over a network and transmitting the GUI to the client device, the GUI displaying the instrument panel in a layout window to a user. The method further includes the step of associating a textual language program with the instrument panel, the textual language program including code for the execution of components in the instrument panel, at least one component on the instrument panel directly corresponding with a section of the code. The program runs in a continuous mode of operation during execution. The method also includes the step of displaying multiple icons representing components in a library that may be placed in the instrument panel.

BRIEF DESCRIPTION OF THE DRAWINGS

These and other aspects of this invention will be readily apparent from the Detailed Description below and the appended drawings, which are meant to illustrate and not limit the invention and in which:

FIG. 1A is a block diagram of an environment suitable for practicing the illustrative embodiment of the present invention;

FIG. 2 is a block diagram of graphical user interface of the present invention including the Graphical Panel Layout Window, the Program Dialog Window, the Component Library Window, and the I/O Device Library Window;

DETAILED DESCRIPTION

Figure 1B:
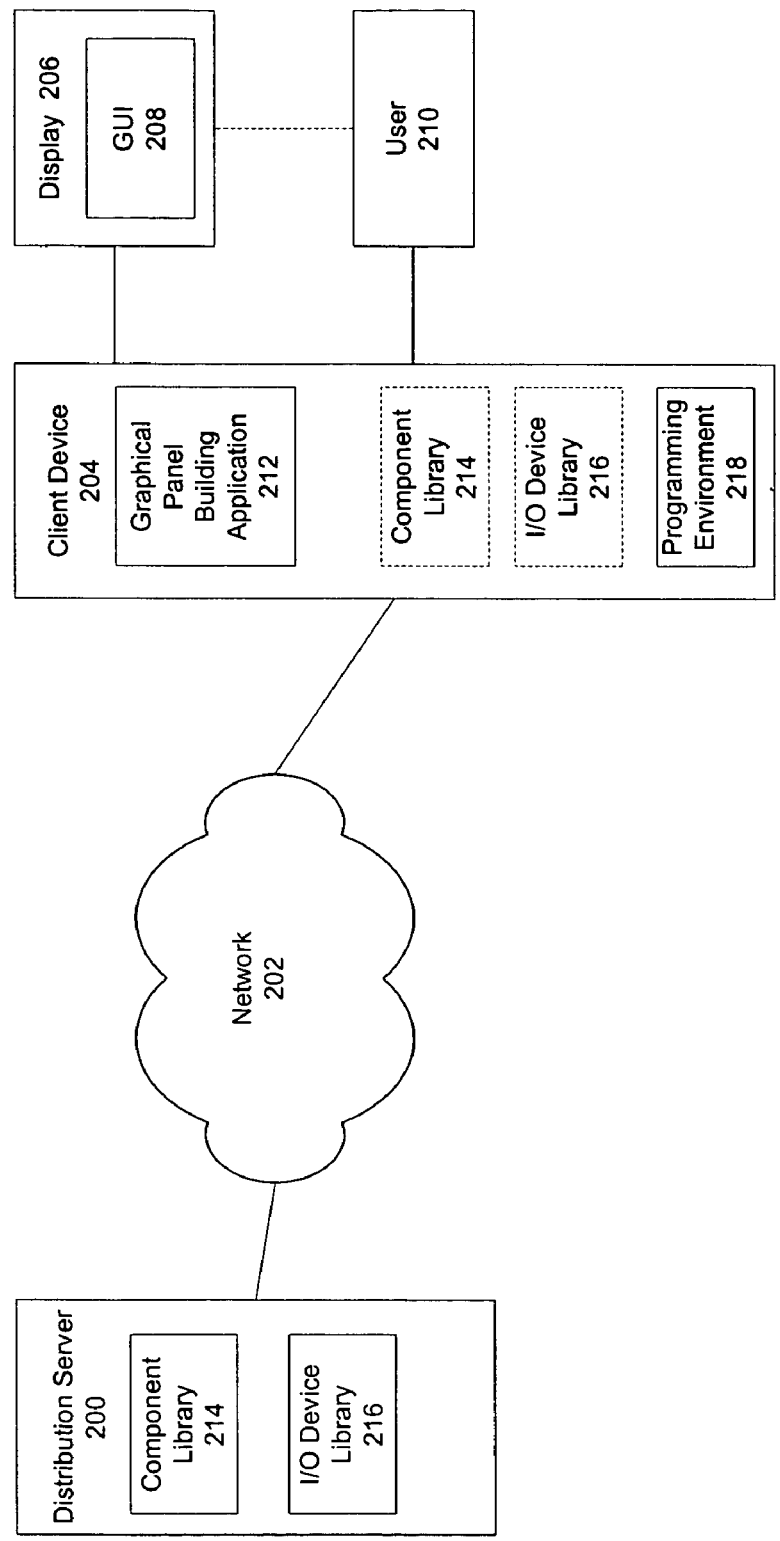
FIG. 1B is a block diagram of an alternative environment suitable for practicing the illustrative embodiment of the present invention using a distribution server.

The illustrative embodiment of the present invention provides a software-based instrument panel in which the panel components are tied on directly to sections of programming code written in a textual language. The textual language program relates to how the panel updates and operates in a continuous fashion. The textual language program sections are in synch with the corresponding components on the instrument panel. The textual language program controls the reading and writing of values for the panel components while other component properties are set on a graphical panel. The system also includes an interface to obtain values for the textual language program.

FIG. 1A depicts a block diagram of an environment suitable for practicing the illustrative embodiment of the present invention. A computational device 2 is accessible to a user 14. The computational device 2 is in communication with a display 12 which is visible to the user 14. The computational device 2 provides access to a graphical panel building application 4. The computational device 2 also hosts or is in communication with a component library 8, an I/O device library 10 and a textual language program 11. The computational device 2 may be a server, laptop, desktop, workstation, or other device equipped with processor and capable of supporting the graphical panel building application 4. The graphical panel building application 4 generates a graphical user interface (GUI) 6 on the display 12 for the user so 14. The GUI 6 includes a Graphical Panel Layout Window 30, and a Program Dialog Window 32. The Graphical Panel Layout Window 30 includes the components and I/O devices for the instrument panel (or other front panel) being built by the user 14. The Program Dialog Window 32 displays the programming code associated with the components and I/O devices in the Graphical Panel Layout Window 30. The programming code is written in a textual language such as MATLAB (MATLAB is a technical computing language and interactive environment from The MathWorks, Inc. of Natick, Mass.). The Graphical Panel Layout Window 30 and the Program Dialog Window 32 are discussed further below. Also included in the GUI 6 are a Component Library Window 34 and an I/O Device Library Window 36 which include and display icons to the user 14 that correspond to the programming code for the components and I/O devices found in the component library 8 and I/O device library 10 respectively.

Those skilled in the art will recognize that the depicted arrangement of system components that is displayed in FIG. 1A is just one of many different implementations possible within the scope of the present invention. For example, although the computational device is depicted in FIG. 1A as hosting the Component Library 8 and I/O Device Library 10, the libraries may be located remotely at a location accessible to the Graphical Panel Building Application 4 over a network. Alternatively, the Component Library 8 and the I/O Device Library 10 may be part of the Graphical Panel Building Application 4. The textual language may be any of a number of languages in addition to MATLAB such as JAVA, C, C#, C++, VHDL, or Verilog. Similarly, the Component Library Window 34 and the I/O Device Library Window 36 may be displayed to the user 14 as a single window and may reference components and I/O devices held in a single library rather than the separate Component Library 8 and I/O Device Library 10, and/or the GUI 6 may include additional windows. Likewise, the user 14 may access the computational device 2 from a remote location.

FIG. 1B depicts a block diagram of an alternate environment suitable for practicing an embodiment of the present invention that uses a distribution server. A distribution server 200 communicates over a network 202 with a client device 204. The network may be a local area network (LAN), a wide area network (WAN), the Internet, a wireless network, or some other type of network. The distribution server 200 hosts the Component Library 214 and the I/O so Device Library 216. The client device 204 hosts a programming environment 218 and the Graphical Panel Building Application 212. The Component Library 214 and I/O Device Library 216 are downloaded upon request from the distribution server 200. The client device 204 is accessed by user 210 and communicates with display 206 which displays the GUI 208 that is generated by the graphical panel building application 212. Those skilled in the art will recognize that the distribution server 200 may host the Component Library 214 and the I/O Device Library 216 or retrieve them from another location prior to downloading them to the client device 204. Similarly one or both of the libraries may be hosted on the client device 204 and other modules may be downloaded from the distribution server 200 in order to practice the present invention. It should also be recognized that although the collections of components and I/O devices have been described herein as being stored in "libraries" other forms of storage are within the scope of the present invention.

Figure 1C:
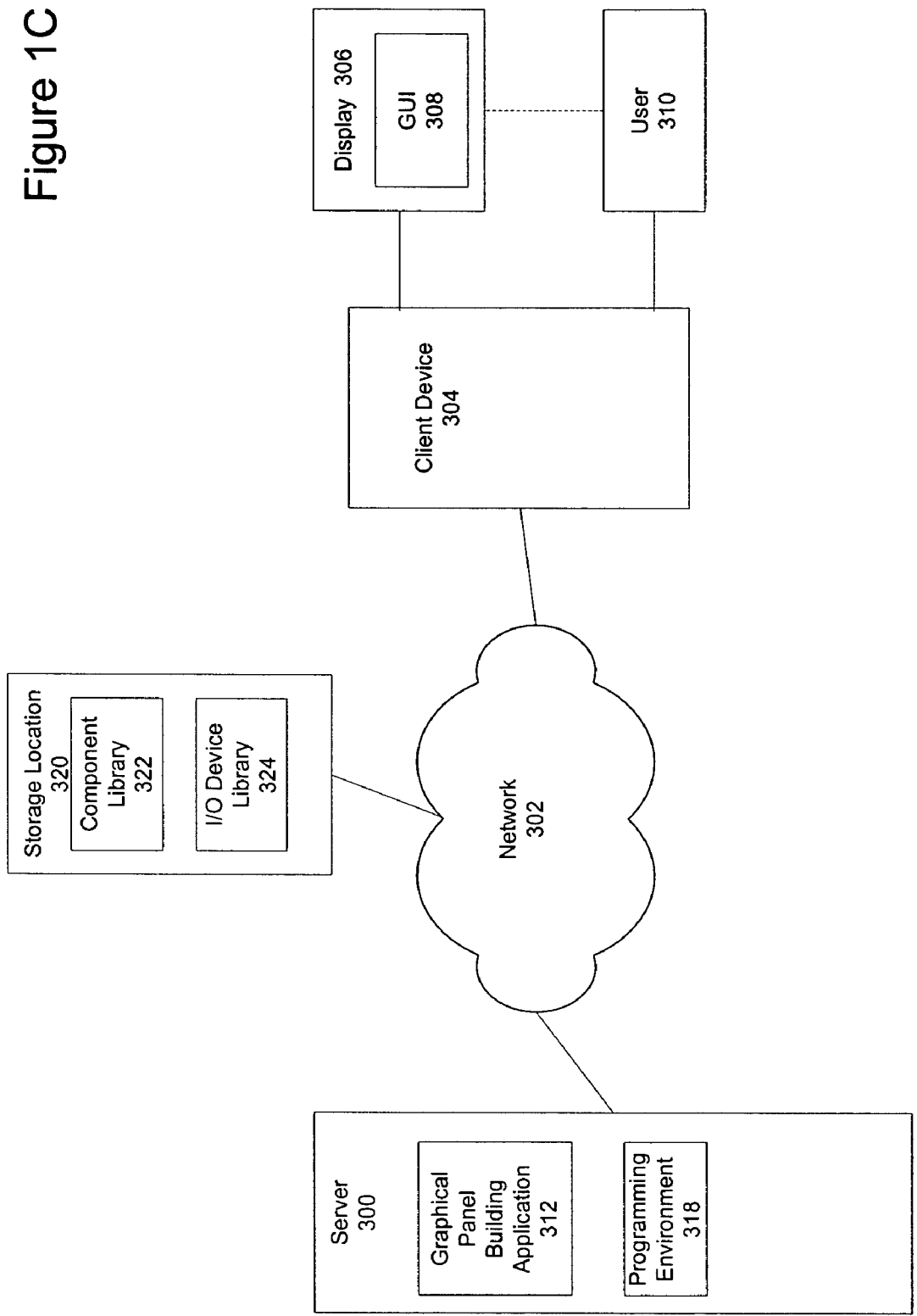
FIG. 1C is a block diagram of an alternative environment suitable for practicing the illustrative embodiment of the present invention using a distributed architecture.

Similarly, FIG. 1C depicts an alternate distributed architecture where the server 300 communicates with the client device 304 over a network 302. The client device 304 may be a thin client. The server 300 hosts the Graphical Panel Building Application 312 and the programming environment 318. The server 300 is also in communication with a storage location 320 over the network 302. The storage location 320 hosts Component Library 322 and I/O Device Library 324. Execution of the Graphical Panel Building Application 312 takes place at the server 300 and the Graphical Panel Building Application streams the output to the client device 304 which displays the GUI 308 on the display 306. A User 310 accesses the client device 304 and views the display 306. The server may then subsequently receive input entered by the user via the GUI displayed at the client-side. Those skilled in the art will recognize that other client-server architectures are also possible within the scope of the present invention in which various parts of the execution of the present invention occur at the client-side or server-side depending upon an implementation choice.

The GUI 6 allows the user 14 practicing the illustrative embodiment of the present invention to build an instrument panel or other type of front panel. FIG. 2 depicts the GUI 6 in greater detail. The GUI 6 includes a Graphical Panel Layout Window 30, a Program Dialog Window 32, a Component Library Window 34, and an I/O Device Library Window 36. As noted above, the Graphical Panel Layout Window 30 shows the components and I/O devices in the instrument panel or front panel being built by the user 14 and may include a plurality of components and I/O devices selected by the user 14. For example, the Graphical Panel Layout Window 30 may include a dial component 40 and an odometer component 42 as well as an I/O device 44 that provides an interface to a data source. The data source may be data in the workspace, a MATLAB function running independently, a separately running program or an external data sink or source. In one implementation, the I/O device icons may only be visible on the instrument panel during editing mode and may disappear from view once execution is initiated. In another implementation, the components and I/O devices can be added, removed, modified, and the GUI can be changed otherwise during execution. At least some of the components (the dial 40 and the odometer 42) in the Graphical Panel Layout Window 30 as well as the I/O Device 44 correspond directly to lines and/or sections of code that are displayed in the Program Dialog Window 32. For example, the dial component 40 may correspond to the displayed line of code 50. The odometer component 42 may correspond to the displayed line of code 52. The I/O device 44 may correspond to the section of code shown as displayed lines of code 54 and 56. In one aspect of the present invention, each of the components in the Graphical Panel Layout window 30 directly correspond on a one-to-one basis with the sections of the code in the Program Dialog Window 32.

The textual language program performs the reading and writing of values of the components while other properties of the components are set directly on the graphical panel. Properties of the programming components and/or I/O devices may be directly altered by the user 14 through the GUI 6. For example, the component/device properties may be altered by right clicking on the desired component or I/O device icon in the Graphical Panel Layout Window 30 which results in the presentation of a properties menu.

The Program Dialog Window 32 displays the programming code associated with the panel components and I/O devices and may also include controls allowing a user 14 to switch between threads of execution. For example, the Program Dialog Window 32 includes tabs 60, 61, 62, 64, 66 and 68 representing different procedures and tasks. Tab 60 is an initialization procedure, tab 61 is a foreground task, tab 62 is a background task, tab 64 is a timed execution task, tab 66 is an event-driven execution task, and tab 68 is a termination procedure. The illustrative embodiment of the present invention allows for shared name spaces between threads. A built-in mechanism protects data when sharing data between different threads of execution. The illustrative embodiment of the present invention also supports priority and rate monotonic scheduling for multi-rate execution so that faster or high priority tasks can interrupt slower or lower priority tasks. Additional language constructs for semaphores enable locking of critical data and shared resources during multi-threaded execution. It should be noted that in addition to the code displayed in the Program Dialog Window that is associated with the components and I/O devices in the Graphical Panel Layout Window, the textual language program may also include additional code that will be run that will not be displayed. This code would include the scheduling and other code necessary to make it a free running application. Optionally, there may also be some callback code that runs that is displayed in the property dialog for the component or I/O device.

Also visible in the GUI 6 is the Component Library Window 34 which contains icons representing components from the Component Library 8 from which the user 14 may select components for the instrument or front panel being built. As an example, the Component Library Window 34 depicted in FIG. 2 may include a generic angular dial 70, an on/off switch 72, a generic knob 74, and an odometer component 76. Those skilled in the art will recognize that many additional components other than those listed herein are possible within the scope of the present invention. Each of the icons may be associated with one or more lines of computer code relating to the execution of the components that are stored or referenced in the component library 8. The associated computer code is added to the textual language program 11 displayed in the Program Dialog Window 32 in the manner explained further below.

Likewise, icons for the I/O devices which may be added to the Graphical Panel Layout Window 30 are found in the I/O Device Library in Window 36. The I/O Device components provide an interface between the instrument panel or other front panel and a data sink or source. The I/O Device Library Window 36 may provide an analog input icon 80, a digital input icon 82, a counter input icon 84, an encoder input icon 86, or other type of input icon 88. The I/O Device Library Window 36 may also include an analog output icon 90, a digital output icon 92, and other output icon 94. These I/O devices allow functions in the textual language program to access data from the outside world such as that from data acquisition boards and instruments, from external memory locations, network connections, or a graphical programming environment. Additionally, the graphical panel building system described herein may also be called as a function from the textual language or directly from environment such as MATLAB. In this way, hierarchical panels may be built-up so that a widget or line of executed code may correspond to a new entirely new panel.

It will be appreciated by those skilled in the art that the windows of the present invention may be presented to a user in a number of different manners. For example, the windows may appear as separate windows displayed on a user's desktop. Alternatively, the windows may appear in an Integrated Design Environment (i.e.: multi-pane windowing interface). Additional programming environments such as the MATLAB command line or the MATLAB M-file editor may be embedded as separate windows within the Integrated Design Environment.

The program code for the components and I/O devices in the component library 8 and I/O device library 10 is associated with the icons displayed in the Component Library Window 34 and I/O Device Library Window 36. The code describes the functionality of the component or I/O device. The textual language program code contains the logic necessary for the updating and execution of the component and/or I/O device. The process by which the component icons in the Component Library Window 34 and the I/O device icons in the I/O Device Library Window 36 are added to the Graphical Panel Layout Window 30, and by which the corresponding code is added to the Program Dialog Window 32, is discussed below in connection with FIG. 3.

Figure 3:
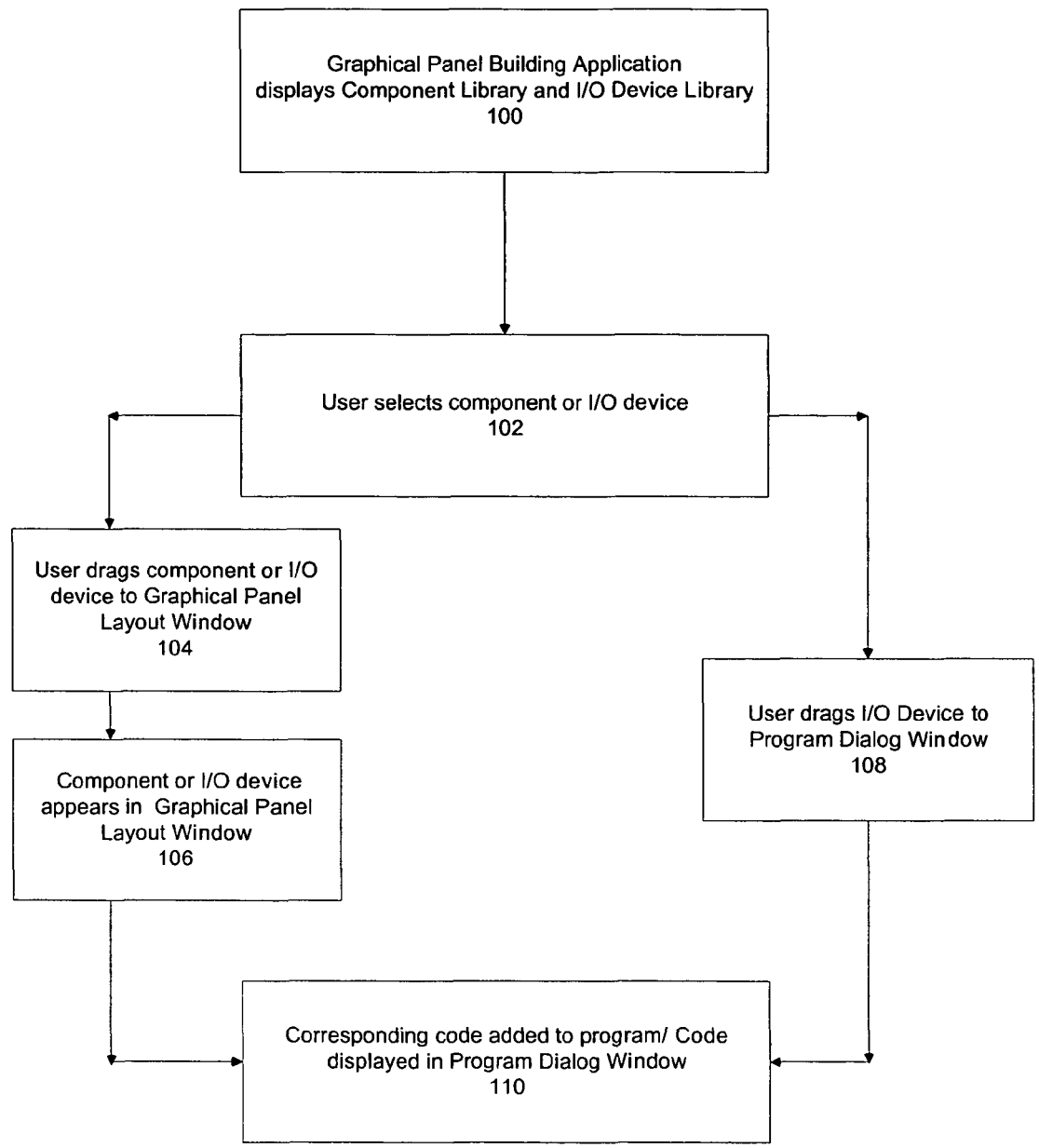
FIG. 3 is a flowchart of the sequence of the steps followed by the illustrative embodiment of the present invention to select and drag a component or I/O device into the Graphical Panel Layout Window/Program Dialog Window.

FIG. 3 depicts the sequence of steps followed by the illustrative embodiment of the present invention to add an I/O device or a component to the Graphical Panel Layout Window 30. The sequence begins when the graphical panel building application 4 displays the Component Library Window 34 and I/O Device Library Window 36 as part of the GUI 6 (step 100). The user then selects a component or I/O device from one of the respective windows (step 102). The selection may be made by means of a mouse click and subsequent dragging of the icon or some combination of key strokes or other selection method known to those skilled in the art. Once the icon is selected, the user may drag the component or I/O device icon to the Graphical Panel Layout Window 30 (step 104) where it is displayed (step 106). A component dragged into the Graphical Panel Layout Window 30 is usually displayed at all times. An I/O device dragged into the Graphical Panel Layout Window 30 is generally displayed only during editing mode. Simultaneously with the dragging of the component or I/O device icon into the Graphical Panel Layout Window 30 (i.e.: the instrument panel or front panel being built by the user) the corresponding code associated with the component or I/O device is automatically added to the textual language program displayed in the Program Dialog Window 32 (step 110). Both the currently selected active component icon or I/O device icon and the corresponding code are highlighted simultaneously in the Graphical Panel Layout Window 30 and Program Dialog Window 32 so that the user is able to see the correspondence between the newly added code sections and the selected component or I/O device.

Similarly, the illustrative embodiment of the present invention also allows the I/O device icon to be dragged directly into the Program Dialog Window 32 instead of the graphical Panel Layout Window 30. After the selection of an I/O device icon (step 102), the user may drag the icon to the Program Dialog Window 32(step 108). The program code associated with the I/O device icon is then programmatically added to the Program Dialog Window 32 (step 110). In one implementation, the icon for the I/O device is not added to the Graphical Panel Layout Window 30 even though the code associated with the I/O) device appears in the Program Dialog Window 32. In an alternate implementation, the I/O device icon is added to the Graphical Panel Layout Window 30 during editing mode.

As mentioned above, the components and I/O devices in the Graphical Panel Layout Window 30 may correspond on a one-to-one basis with a line of code or section of code (comprising multiple lines of code) in the textual language program displayed in the Program Dialog Window 32. This one-to-one correspondence between the component/device and the code line/section represents synchronization such that, for example, deletion of lines of code in the textual language program results in the deletion of the component or I/O device in the Graphical Panel Layout Window. Similarly, the deletion of a component or I/O device in the Graphical Panel Layout Window might result in the deletion of the corresponding line or section of code in the Program Dialog Window 32. Likewise, the change of the name of the component in the programming dialog window may result in a corresponding name change for the display component in the instrument panel. Adding a line of code in the Program Dialog Window with the correct syntax may also produce an icon in a default location in the Graphical Panel Layout Window.

The placement of the code corresponding to the components and I/O devices at a particular location in the textual language program may be handled in a number of different ways depending upon the chosen implementation of the present invention. For example, in one implementation, if the user is dragging a component or I/O device into the Graphical Panel Layout Window, the corresponding code may be automatically placed at the end of the text in the Program Dialog Window or at the top of the window. In another implementation the text may appear as floating text on the end of the mouse pointer (following the dragging of the icon into either the Program Dialog Window or Graphical Panel Layout Window) to be subsequently placed in a user selected location. In a different implementation, where the cursor is already in the middle of text in the Program Dialog Window, a line may be inserted at the next break in code and the new text inserted at that location. Other implementations will be apparent to those skilled in the art. Because the code is not being executed sequentially, the particular physical location of the code within the textual language program is irrelevant to the execution of the program.

Figure 4:
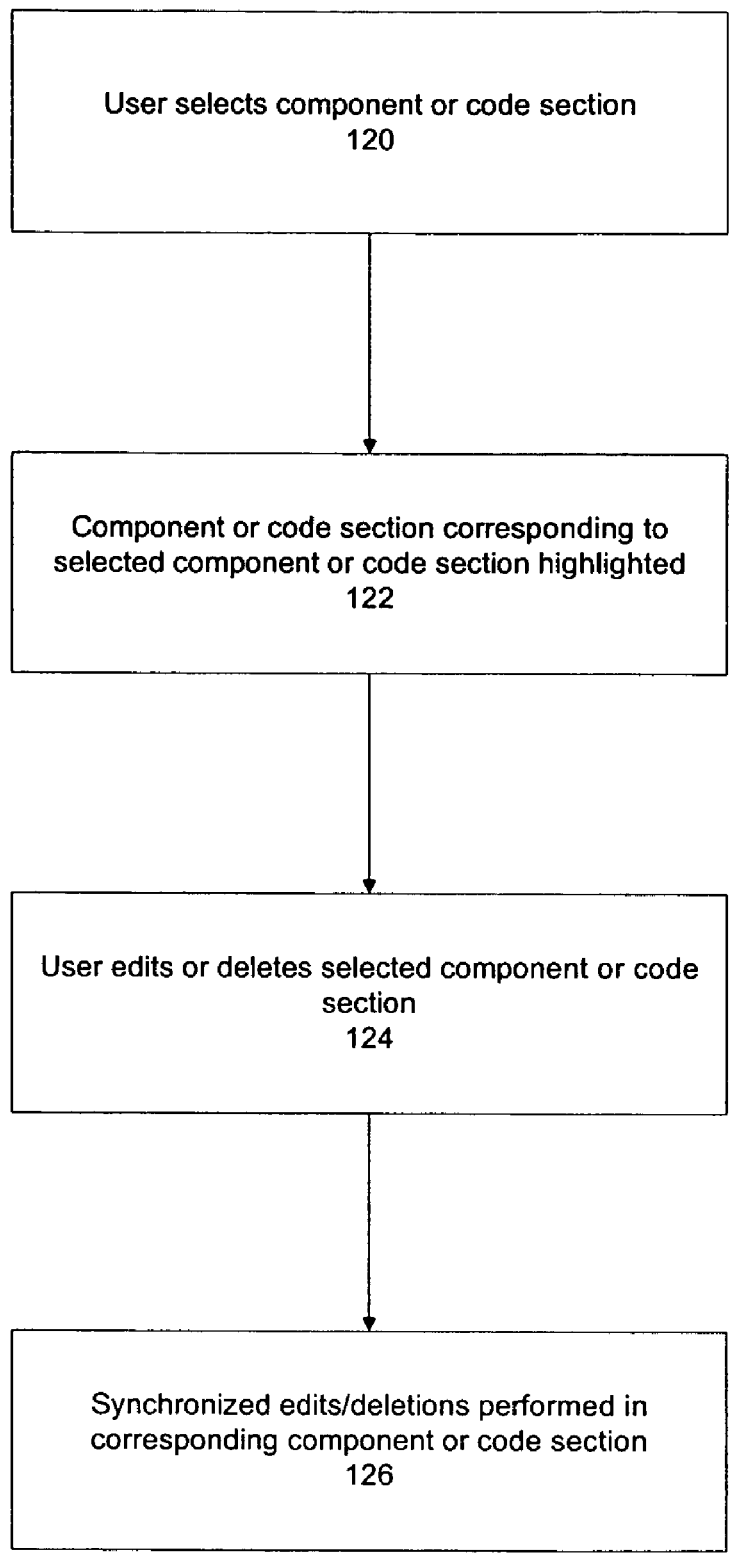
FIG. 4 is a flowchart depicting the sequence of steps followed by the illustrative embodiment of the present invention to perform synchronization between the Graphical Panel Layout Window and the Program Dialog Window during editing/deleting operations.

FIG. 4 is a flowchart depicting the sequence of steps followed by the illustrative embodiment of the present invention to provide synchronization between the Graphical Panel Layout Window 30 and the Program Dialog Window 32 during editing/deleting operations. The sequence begins when the user selects a component in the Graphical Panel Layout Window 30 or a code section in the Program Dialog Window 32 (step 120). The component or code section corresponding to the selected component or code section is then highlighted in the other (non-selected) window (step 122). When the user edits or deletes the selected component or code section (step 124), synchronized operations such as edits/deletions are programmatically performed for the corresponding component or code section (step 126).

The use of the textual language to control the execution and updating of the instrument panel and components and I/O devices enable complex computations to be performed during a continuous running mode. The correspondence between the components or I/O devices and the code sections enables the execution of the instrument panel or other front panel in a continuous mode without resorting to the time-consuming callbacks found in VISUAL BASIC type systems. Additionally, the use of a textual programming language enables significantly more complex operations to be performed than are possible using conventional data flow diagrams such as those found in systems in which the front panel is tied to a data flow diagram. The use of the textual programming language also enables the interfacing of the code for the panel and I/O devices with other programming environments.

Those skilled in the art will recognize that various implementations of the instrument panel and front panel building system described herein are possible within the scope of the present invention. In one aspect of the present invention, the system may be saved and loaded as a single file thus preserving all of the current values. In another aspect of the present invention, only one instance of the associated component exists in the text program at the same time, thus providing a duality between the textual language program and the graphical panel. In another aspect of the present invention, multiple instances of components may be allowed and the textual language program automatically selects from among the multiple widgets and deletes them as appropriate. The graphical widget is deleted in response to the deletion of the last textual reference. In a different aspect of the present invention, the system may or may not include an interface to an external data source.

Although the illustrative embodiment of the present invention has been described with reference to continuous modes of execution, it should be understood that it may also be practiced in alternate modes. For example, the execution mode may be based on polling of the various components, may execute based on sample times, and may be event-based execution.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include MATLAB, Java, C, C++, C#, VHDL, or Verilog. The software programs may be stored on or in one or more mediums as object code.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computer-implemented system for building instrument or front panels, comprising:
a computational device providing access to a graphical panel building application, where:
the graphical panel building application generates a graphical user interface (GUI) for rendering and placing components on an instrument or front panel, where:
at least one component on the instrument or front panel:
directly corresponds with, and interacts only with, a section of code in a textual language program,
displays input or output values for the textual language program during execution of the textual language program, and
does not interact with or correspond with a graphical diagram,
the textual language program includes code for the execution of one or more components on the instrument or front panel, and
the instrument or front panel runs in a continuous mode of operation during the execution of the textual language program; and
a display device in communication with the computational device, the display device displaying the GUI, the GUI:
displaying the instrument or front panel,
separately displaying the textual language program, and
displaying in a window with the textual language program at least one control allowing a user to switch between threads of execution of the textual language program, the threads of execution comprising two or more of: an initialization procedure, a foreground task, a background task, a timed execution task, an event-driven execution task, and a termination procedure.

2. The system of claim 1, wherein there is a one-to-one correspondence between each of the components on the instrument or front panel to corresponding sections of code in the textual language program.

3. The system of claim 1, further comprising:
at least one interface to an external data sink.

4. The system of claim 1, further comprising:
at least one interface to an external data source.

5. The system of claim 1, further comprising:
a library holding components that are placed in the instrument or front panel.

6. The system of claim 5 wherein a component from the library of components is represented by an icon that may be dragged by a user into the displayed instrument or front panel.

7. The system of claim 6 wherein the GUI enables the user to set properties of the components in the displayed instrument or front panel.

8. The system of claim 6 wherein the properties include at least one of a widget property or a property of an I/O device.

9. The system of claim 1 wherein the code in the textual language program is written in one of MATLAB, Java, C, C++, C#, VHDL, or Verilog.

10. The system of claim 1 wherein the program switches between threads of execution.

11. The system of claim 1, further comprising:
a library of I/O devices from which the interface to an external data sink or source may be selected.

12. In a computational device, a computer-implemented method of building instrument or front panels, comprising the steps of:
providing, with a computing device, a graphical user interface (GUI) for rendering and placing components on an instrument or front panel, the GUI displaying the instrument or front panel to a user;
associating, with the computing device, a textual language program with the instrument or front panel, the textual language program separately displayed and including code for the execution of one or more components on the instrument or front panel, the display of the textual language program occurring in a window, the window displaying at least one control allowing a user to switch between threads of execution of the textual language program, the threads of execution comprising two or more of: an initialization procedure, a foreground task, a background task, a timed execution task, an event-driven execution task, and a termination procedure, at least one of the components on the instrument or front panel:
- displaying input or output values for the textual language program during execution of the textual language program,
- directly corresponding with, and interacting only with, a section of code in the textual language program, and
- not interacting with or corresponding with a graphical diagram; and
- displaying, with the computing device, a plurality of icons representing components in a library that may be placed in the instrument or front panel, the instrument or front panel running continuously during execution of the textual language program.

13. The method of claim 12, comprising the further step of:
dragging an icon representing a component in the library of components into the display of the instrument or front panel, the act of dragging the icon representing the component into the displayed instrument or front panel causing the creation of code in the textual language program that directly corresponds to the component, the created code separately displayed.

14. The method of claim 12 wherein the GUI enables a user to set properties of the components in the displayed instrument or front panel.

15. The method of claim 12 wherein the properties include at least one of a widget property or a property of an I/O device.

16. The method of claim 12 wherein the instrument or front panel includes at least one interface to one of an external data source and an external data sink.

17. The method of claim 12 wherein the code in the textual language program is written in one of MATLAB, Java, C, C++, C#, VHDL, or Verilog.

18. The method of claim 12, further comprising the steps of:
providing a library of I/O devices from which an interface to one of an external data source and external data sink may be selected.

19. The method of claim 18, comprising the further step of:
dragging an icon representing a device in the library of I/O devices into the display of the instrument or front panel, the act of dragging the icon representing the I/O device into the display of the instrument or front panel causing the creation of code in the textual language program that directly corresponds to the I/O device, the created code separately displayed.

20. The method of claim 18, comprising the further step of:
dragging an icon representing a device in the library of I/O devices into the display of the textual language program, the act of dragging the icon representing the I/O device into the display of the textual language program causing the creation of code in the textual language program that directly corresponds to the I/O device, the created code displayed in the display of the textual language program.

21. A non-transitory computer-readable storage medium holding computer-executable instructions for building instrument or front panels, the instructions when executed causing a computing device to:
provide a graphical user interface (GUI) for rendering and placing components on an instrument or front panel, the GUI displaying the instrument or front panel to a user;
associate a textual language program with the instrument or front panel, the textual language program separately displayed and including code for the execution of one or more components in the instrument or front panel, the display of the textual language program occurring in a window, the window displaying at least one control allowing a user to switch between threads of execution, the threads of execution comprising two or more of: an initialization procedure, a foreground task, a background task, a timed execution task, an event-driven execution task, and a termination procedure, at least one component on the instrument or front panel:
- displaying input or output values for the textual language program during execution of the textual language program,
- directly corresponding with, and interacting only with, a section of code in the textual language program, and
- not interacting with or corresponding with a graphical diagram; and
- run the instrument or front panel continuously when the textual language program is executing.

22. The medium of claim 21, wherein the execution of the instructions further cause the computing device to:
display the dragging of an icon representing a component in the library of components into the display of the instrument or front panel, the act of dragging the icon representing the component into the display of the instrument or front panel causing the creation of code in the textual language program that directly corresponds to the component, the created code separately displayed.

23. The medium of claim 21 wherein the GUI enables a user to set properties of the components in the display of the instrument or front panel.

24. The medium of claim 21 wherein the properties include at least one of a widget property or a property of an I/O device.

25. The medium of claim 21 wherein the instrument or front panel includes at least one interface to one of an external data source and external data sink.

26. The medium of claim 21 wherein the code in the textual language program is written in one of MATLAB, Java, C, C++, C#, VHDL, or Verilog.

27. The medium of claim 21, wherein the execution of the instructions further causes the computing device to:
provide a library of I/O devices from which an interface to one of an external data source and external data sink may be selected.

28. The medium of claim 27, wherein the execution of the instructions further causes the computing device to:
display the dragging of an icon representing a device in the library of I/O devices into the display of the instrument or front panel, the act of dragging the icon representing the I/O device into the display of the instrument or front panel causing the creation of code in the textual language program that directly corresponds to the I/O device, the created code displayed in the display of the textual language program.

29. The medium of claim 27, wherein the execution of the instructions further causes the computing device to:
display the dragging of an icon representing a device in the library of I/O devices into the display of the textual language program, the act of dragging the icon representing the I/O device into the display of the textual language program causing the creation of code in the textual language program that directly corresponds to the I/O device, the created code displayed in the display of the textual language program.

30. A computer-implemented system for building instrument or front panels, comprising:
a computational device providing access to a graphical panel building application, where:
the graphical panel building application generates a graphical user interface (GUI) for rendering and placing components on an instrument or front panel, where:
the textual language program includes code for the execution of the components in the instrument or front panel,
the components on the instrument or front panel:
displaying input or output values for the textual language program during execution of the textual language program,
directly corresponding with, and interacting only with, a section of code in the textual language program, and
not interacting with or corresponding with a graphical diagram, and
the instrument or front panel runs in a continuous mode of operation during the execution of the textual language program; and
a display device in communication with the computational device, the display device displaying the GUI, the GUI:
displaying the instrument or front panel,
separately displaying the textual language program, and
displaying in a window with the textual language program at least one control allowing a user to switch between threads of execution in the textual language program, the threads of execution comprising two or more of: an initialization procedure, a foreground task, a background task, a timed execution task, an event-driven execution task, and a termination procedure.

31. A computer-implemented system for building front panels for a virtual instrument, comprising:
a computational device providing access to a graphical panel building application where:
the graphical panel building application generates a graphical user interface (GUI) for rendering and placing components on a front panel for a virtual instrument, where:
the textual language program including code for the execution of the components in the front panel, at least one component on the front panel:
directly corresponding with, and interacting only with, a section of code in the textual language program,
displaying input or output values for the textual language program during execution of the textual language program, and
not interacting with or corresponding with a graphical diagram, and
the front panel for the virtual instrument runs in a continuous mode of operation during the execution of the textual language program; and
at least one of a collection of data structures holding components that are placed in the front panel and a collection of data structures holding I/O devices that are placed in the front panel, the at least one of a collection of data structures holding components and collection of data structures holding I/O devices accessible from the computational device;
a distribution server distributing to a client device at least one of the graphical panel building application, the generated GUI, the textual language program, and the at least one collection of data structures;
a client device in communication with the distribution server; and
a display device in communication with the computational device, the display device displaying the GUI, the GUI:
displaying the front panel,
separately displaying the textual language program, and
displaying in a window with the textual language program at least one control allowing a user to switch between threads of execution in the textual language program, the threads of execution comprising two or more of: an initialization procedure, a foreground task, a background task, a timed execution task, an event-driven execution task, and a termination procedure.

32. The system of claim 31 wherein each component in the front panel directly corresponds on a one-to-one basis with a section of code in the textual language program.

33. In a network, a method of building instrument panels for a virtual instrument, comprising the steps of:
providing a server executing a graphical panel building application, the graphical panel building application generating a graphical user interface (GUI) for rendering and placing components on an instrument panel;
providing a client device in communication with the server over a network;
transmitting the GUI to the client device, the GUI displaying the instrument panel to a user;
associating a textual language program with the instrument panel, the textual language program separately displayed and including code for the execution of the components in the instrument panel, the display of the textual language program occurring in a window, the window displaying at least one control allowing a user to switch between threads of execution of the textual language program, the threads of execution comprising two or more of: an initialization procedure, a foreground task, a background task, a timed execution task, an event-driven execution task, and a termination procedure, at least one component on the instrument panel:
displaying input or output values for the textual language program during execution of the textual language program,
directly corresponding with, and interacting only with, a section of code in the textual language program, and
not interacting with or corresponding with a graphical diagram, the instrument panel running in a continuous mode of operation during the execution of the textual language program; and
displaying a plurality of icons representing components in a library that may be placed in the instrument panel.

34. The method of claim 33, comprising the further step of:
receiving at the server input entered by the user at the client device via the GUI.

* * * * *